United States Patent
Stentiford

(10) Patent No.: US 8,135,210 B2
(45) Date of Patent: Mar. 13, 2012

(54) IMAGE ANALYSIS RELATING TO EXTRACTING THREE DIMENSIONAL INFORMATION FROM A TWO DIMENSIONAL IMAGE

(75) Inventor: Frederick W M Stentiford, Woodbridge (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1032 days.

(21) Appl. No.: 11/988,874

(22) PCT Filed: Jun. 30, 2006

(86) PCT No.: PCT/GB2006/002444
§ 371 (c)(1),
(2), (4) Date: Jan. 16, 2008

(87) PCT Pub. No.: WO2007/012798
PCT Pub. Date: Feb. 1, 2007

(65) Prior Publication Data
US 2009/0252421 A1    Oct. 8, 2009

(30) Foreign Application Priority Data

Jul. 28, 2005  (EP) .................................... 05254728

(51) Int. Cl.
*G06K 9/00*    (2006.01)

(52) U.S. Cl. ......... 382/154; 382/104; 382/201; 382/202
(58) Field of Classification Search .................. None
See application file for complete search history.

(56) References Cited

U.S. PATENT DOCUMENTS 4,646,352 A    2/1987  Asai et al.
5,113,454 A    5/1992  Marcantonio et al.
(Continued)

FOREIGN PATENT DOCUMENTS
EP    0098152    1/1984
(Continued)

OTHER PUBLICATIONS

Green, B. (Jun. 2005) "Canny edge detection tutorial." http://www.pages.drexel.edu/~weg22/can_tut.html. Retrieved from The Internet Archive, http://www.archive.org/.*

(Continued)

*Primary Examiner* — Bhavesh Mehta
*Assistant Examiner* — Barry Drennan
(74) *Attorney, Agent, or Firm* — Nixon & Vanderhye P.C.

(57) ABSTRACT

An image, represented by an ordered set of elements ($x_i$) each having a value is analysed in order to detect vanishing points. The method comprises, for each of a plurality of root positions ($x_0$), repeatedly performing the steps of: (i) selecting a first plurality of elements ($x_i$) from the ordered set; (ii) for each selected element ($x_i$), selecting a second element ($u_i$) such that the selected second element has a vector position relative to the root position that is scaled by a factor ($\alpha$) in comparison with the position of the first selected element; (iii) determining whether the selected elements meet a match criterion requiring that the value of each of the first elements is similar to the value of the corresponding second element; and (iv) in the event of a match, updating a similarity score (H) in respect of that root element. Once these scores have been found, they can be examined a part of the image corresponding to a peak value of the similarity score.

10 Claims, 5 Drawing Sheets

U.S. PATENT DOCUMENTS

| | | | |
|---|---|---|---|
| 5,200,820 | A | 4/1993 | Gharavi |
| 5,303,885 | A | 4/1994 | Wade |
| 5,703,968 | A * | 12/1997 | Kuwahara et al. ............ 382/269 |
| 5,790,413 | A | 8/1998 | Bartusiak et al. |
| 5,825,016 | A | 10/1998 | Nagahata et al. |
| 5,867,813 | A | 2/1999 | Di Pietro et al. |
| 5,978,027 | A | 11/1999 | Takeda |
| 6,091,844 | A | 7/2000 | Fujii et al. |
| 6,094,507 | A | 7/2000 | Monden |
| 6,111,984 | A | 8/2000 | Fukasawa |
| 6,240,208 | B1 | 5/2001 | Garakani et al. |
| 6,260,059 | B1 | 7/2001 | Ueno et al. |
| 6,266,676 | B1 | 7/2001 | Yoshimura et al. |
| 6,282,317 | B1 | 8/2001 | Luo et al. |
| 6,304,298 | B1 | 10/2001 | Steinberg et al. |
| 6,389,417 | B1 | 5/2002 | Shin et al. |
| 6,480,629 | B1 | 11/2002 | Bakhmutsky |
| 6,483,937 | B1 | 11/2002 | Samuels |
| 6,499,009 | B1 | 12/2002 | Lundberg et al. |
| 6,590,937 | B1 | 7/2003 | Ogura et al. |
| 6,778,699 | B1 | 8/2004 | Gallagher |
| 6,934,415 | B2 | 8/2005 | Stentiford |
| 6,996,291 | B2 | 2/2006 | Nahum |
| 7,142,689 | B2 | 11/2006 | Hayashi et al. |
| 2001/0013895 | A1 | 8/2001 | Aizawa et al. |
| 2001/0030759 | A1 | 10/2001 | Hayashi et al. |
| 2002/0081033 | A1 | 6/2002 | Stentiford |
| 2002/0126891 | A1 | 9/2002 | Osberger |
| 2002/0168117 | A1 | 11/2002 | Lee et al. |
| 2005/0031178 | A1 | 2/2005 | Park |
| 2005/0074806 | A1 | 4/2005 | Skierczynski et al. |
| 2005/0143976 | A1 | 6/2005 | Steniford |
| 2005/0169535 | A1 | 8/2005 | Stentiford |
| 2006/0050993 | A1 | 3/2006 | Stentiford |
| 2007/0116354 | A1 | 5/2007 | Stentiford |
| 2008/0075372 | A1 | 3/2008 | Stentiford |
| 2010/0266212 | A1 * | 10/2010 | Maurer et al. ............... 382/206 |

FOREIGN PATENT DOCUMENTS

| | | |
|---|---|---|
| EP | 1 126 411 | 8/2001 |
| EP | 1286539 | 2/2003 |
| EP | 1 533 996 | 5/2005 |
| GB | 1417721 | 12/1975 |
| JP | 03-238533 | 10/1991 |
| JP | 3-238566 | 10/1991 |
| JP | 06-245064 | 9/1994 |
| JP | 07-027537 | 1/1995 |
| JP | 10-260773 | 9/1998 |
| JP | 2000-207420 | 7/2000 |
| JP | 2000-512790 | 9/2000 |
| JP | 2002-50066 | 2/2002 |
| JP | 2003-187217 | 7/2003 |
| WO | 82/01434 | 4/1982 |
| WO | 90/03012 | 3/1990 |
| WO | 99/05639 | 2/1992 |
| WO | 98/47061 | 10/1998 |
| WO | 99/60517 | 11/1999 |
| WO | 00/33569 | 6/2000 |
| WO | 01/31638 | 5/2001 |
| WO | 01/61648 | 8/2001 |
| WO | 02/21446 | 3/2002 |
| WO | 02/098137 A1 | 12/2002 |
| WO | 03/081523 | 10/2003 |
| WO | 03/081577 | 10/2003 |
| WO | 2004/042645 | 5/2004 |
| WO | 2004/057493 | 6/2004 |
| WO | 2005/057490 | 6/2005 |
| WO | 2006/030173 | 3/2006 |
| WO | 2006/131701 | 12/2006 |
| WO | 2007/012798 | 2/2007 |
| WO | 2007/071918 | 6/2007 |

OTHER PUBLICATIONS

International Search Report for PCT/GB2006/002444 mailed Sep. 4, 2006.

Zhao D., Shridhar M., Daut D.G., "Morphology on Detection of Calcifications in Mammograms," Digital Signal Processing 2, Estimation, VLSI, San Francisco, Mar. 23-26, 1992, Proceedings of the International Conference on Acoustics, Speech and Signal Processing (ICASSP), New York, IEEE, US-ISBN 0-7803-0532-9, vol. 5 Conf. 17, pp. 129-132.

Brown L.G., A survey of image registration techniques, ACM Computing Surveys, vol. 24, No. 4 (Dec. 1992), pp. 325-376.

Lutton, E., Maitre H., and Lopez-Krahe, J., "Contribution to the determination of vanishing points using Hough transform," IEEE Trans. On Pattern Analysis and Machine Intelligence vol. 16, No. 4, pp. 430-438, (Apr. 1994).

Santini S. & Jain R., "Similarity Matching," Proc $2^{nd}$ Asian Conf. on Computer Vision, pp. II 544-548, IEEE, 1995.

McLean, G.F., and Kotturi, D., "Vanishing point detection by line clustering," IEEE Trans. On Pattern Analysis and Machine Intelligence, vol. 17 No. 11, pp. 1090-1095, Nov. 1995.

Guoyou Wang et al., "Efficient method for multistate small target detection from a natural scene," Optical Engineering, Soc. Of Photo-Optical Instrumentation Engineers, Bellingham, US—ISSN 0091-3286, vol. 35, No. 3 (Mar. 1, 1996), pp. 761-768.

Koizumi T., Chun H-S, Zen H., "A new optical detector for a high-speed AF control", IEEE Transactions on Consumer Electronics, IEEE Inc., New York, US—ISSN 0098-3063, vol. 42, Nr. 4 (Nov. 1996), pp. 1055-1061.

Young Rui, Huang T.S., Mehrota S., Ortega M., "A relevance feedback architecture for content-based multimedia information retrieval systems," Proceedings IEEE Workshop on Content-Based Access of Image an dVideo Libraries, 1997 San Juan, Puerto Rico Jun. 20, 1997, Los Alamitos, CA, USA, IEEE Comput. Soc., US-ISBN 0-8186-7981-6, pp. 82-89.

Rohwer R., Morciniec M., "The Theoretical and Experimental Status of the n-tuple Classifier," Neural Networks, Elsevier Science Publishers, Barking, BG-ISSN 0893-6080, vol. 11, No. 1 (Jan. 1998), pp. 1-14.

Walker et al., "Locating salient facial features using image invariants," Proc. 3rd IEEE International Conference on Automatic Face and Gesture recognition, 1998, pp. 242-247.

Mahlmeister et al., "Sample-guided progressive image coding," Proc. Fourteenth Int. Conference on Pattern Recognition, Aug. 16-20, 1998, pp. 1257-1259, vol. 2.

Osberger, W. and Maeder, A.J., "Automatic Identification of perceptually important regions in an image," Proc. Fourteenth Int. Conference on Pattern Recognition, Aug. 16-20, 1998, pp. 701-704 vol. 1.

Buhmann, J.M., "Dithered Colour Quantisation," Eurographijics 98, Sep. 1998 http://opus.tu-bs.de/opus/volltexte/2004/593/pdf/TR-tubs-cg-1998-01.pdf.

Rui Y. et al., "Relevance feedback: a power tool for interactive content-based image retrieval," IEEE Transactions on Circuits and Systems for Video Technology, IEEE Inc., New York, US-ISSN 1051-8215, vol. 8, Nr. 5 (Sep. 1, 1998), pp. 644-655.

M.E.J. Wood, N. W. Campbell and B.T. Thomas, "Iterative Refinement by Relevance Feedback in Content-Based Digital Image Retrieval," Proceedings of the Sixth ACM International Conference on Multimdedia Sep. 12, 1998, pp. 13-20.

Gallet O., Gaussier P., Cocquerez J-P, "A model of the visual attention to speed up image analysis," Proceedings of the 1998 IEEE International Conference on Image Processing (ICIP-98), Chicago, Illinois, Oct. 4-7, 1998, IEEE Computer Society, 1998, ISBN 0-8186-8821-1, vol. 1, pp. 246-250.

Itti, J., Kock, C. and Niebur, E., "A model of saliency-based visual attention for rapid scene analysis," IEEE Trans. on Pattern Analysis and Machine Intelligence, vol. 20, No. 11, pp. 1254-1259, Nov. 1998.

Shufelt, J.A., "Performance evaluation and analysis of vanishing point detection techniques," IEEE Trans. On Pattern Analysis and Machine Intelligence, vol. 21, No. 3, pp. 282-288, 1999.

K. Curtis, P.W. Foster and F.W.M. Stentiford, "Metadata—the key to content management services," $3^{rd}$ IEEE Metadata Conference, Apr. 6-7, 1999.

F.W.M. Stentiford,"Evolution: the best possible search algorithm?" BT Technology Journal, vol. 18, No. 1, Jan. 2000 (Movie version).

Wixson L., "Detecting Salient Motion by Accumulating Directionally-Consistent Flow," IEEE Transactions on Pattern Analysis and Machine Intelligence, IEEE Inc., New York, US—ISSN 0162-8828, vol. 22, No. 8 (Aug. 2000), pp. 774-780.

Rother, C., "A new approach for vanishing point detection in architectural environments," 11th British Machine Vision Conference, Bristol, UK, Sep. 2000. http://www.bmva.ac.uk/bmvc/2000/papers/p39.pdf.

Privitera et al., "Algorithms for defining visual regions-of-interest: comparison with eye fixation," IEEE Trans. On Pattern Analysis and Machine Intelligence, vol. 22, No. 9 (Sep. 2000), pp. 970-982.

Zhao, W. et al., "Face recognition: A Literature Survey," CVLK Technical Report, University of Maryland, Oct. 2000. ftp://ftp.cfar.umd.edu/TRs/CVL-Reports-2000/TR4167-zhao.ps.gz.

Raeth P.G. et al., "Finding Events Automatically in Continuously Sampled Dta Streams via Anomaly Detection," Proceedings of the IEEE 2000 national Aerospace and Electronics Conference. NAECON, Oct. 10-12, 2000. pp. 580-587.

Smeulders, A.W.M., Worring, M.; Santini,S; Gupta, A; Jain, R.: "Content-based image retrieval at the end of the early years," IEEE Transactions on Pattern Analysis and Machine Intelligence, IEEE Inc., New York, US-ISSN 0162-8828, vol. 22, Nr. 12 (Dec. 2000), pp. 1349-1380.

Sebastian, T.B. et al., "Recognition of Shapes by Editing Shock Graphs," Proc. ICCV 2001, pp. 755-762.

Vailaya, A. et al., "Image Classification for Content-Based Indexing," IEEE Trans on Image Processing, vol. 10, No. 1, pp. 117-130, Jan. 2001.

L-Q, Xu, J. Zhu, and F.W.M. Stentiford, "Video summarization and semantic editing tools," in Storage and Retrieval for Media Databases, Proc SPIE vol. 4315, San Jose, Jan. 21-26, 2001.

Stentiford, F.W.M., "An estimator for visual attention through competitive novelty with application to image compression," Picture Coding Symposium, Seoul, pp. 101-104, 2001 http://www.ee.ucl.ac.uk/~fstentif/PCS2001.pdf.

F.W.M. Stentiford,"An evolutionary programming approach to the simulation of visual attention," Congress on Evolutionary Computation, Seoul, May 27-30, 2001 pp. 851-858.

Cantoni, V., Lombardi, L., Porta, M., and Sicard, N., "Vanishing point detection: representation analysis and new approaches," 11th Int. Conf. on Image Analysis and Processing, Palermo, Italy Sep. 26-28, 2001.

Ouerhani et al., "Adaptive colour image compression based on visual attention," Proc. 11th Int. Conference on Image Analysis and Processing, Sep. 26-28, 2001, pp. 416-421.

M. Russ, I. Kegel and F.W.M. Stentiford, "Smart Realisation: delivering content smartly," J. Inst. BT Engineers, vol. 2, Part 4, pp. 12-17, Oct.-Dec. 2001.

F.W.M. Stentiford, N. Morley, and A. Curnow, "Automatic Identification of Regions of Interest with Application to the Quantification of DNA damage in Cells," in Human Vision and Electronic Imaging, VII, B. E. Rogowitz, T.N. Pappas, Editors, Proc SPIE VI. 4662, pp. 244-253, San Jose, Jan. 20-26, 2002.

A. P. Bradley and F.W.M. Stentiford, "JPEG 2000 and region of interest coding," Digital Imaging Computing—Techniques and Applications, Melbourne, Australia, Jan. 21-22, 2002.

M. Roach, J. Mason, L-Q Xu, and F.W.M. Stentiford, "Recent trends, in video analysis: a taxonomy of vido classification problems," 6th IASTED Int. Conf. on Intenet and Multimedia Systems and Applications, Hawaii, Aug. 12-14, 2002, p. 348-353.

A. P. Bradley and F.W.M. Stentiford, "Visual attention for region of interest coding in JPEG 2000," Journal of Visual Communication and Image Representation, vol. 14, pp. 232-250, 2003.

F.W.M. Stentiford, "An attention based similarity measure with application to content based information retrieval," in Storage and Retrieval for Media Databases 2003, M.M. Yeung, R.W. Lienhart, C-S Li, Editors, Proc SPIE vol. 5021, Jan. 20-24, Santa Clara, 2003.

Almansa, A., and Desolneux, A., "Vanishing Point Detection with any a priori information," IEEE Trans. On Pattern Analysis and Machine Intelligence, vol. 25, No. 4, pp. 502-506, Apr. 2003.

F.W.M. Stentiford, "An Attention based similarity measure for fingerprint retrieval," Proc. 4th European Workshop on Image Analysis for Multimedia Interactive Services, pp. 27-30, London, Apr. 9-11, 2003.

Okabe, T. et al., "Object Recognition based on Photometric Alignment using Ransac," Proceedings 2003 IEEE Cnferen e on Computer Vision and Pattern Recognition, CVPR 2003, vol. 2, pp. 221-228, Jun. 19-20, 2003.

F.W.M. Stentiford, "The measurement of the salience of targets and distractors through competitive novelty," 26th European Conference on Visual perception, Paris, Sep. 1-5, 2003 (Poster).

O. Oyekoya and F. W. M. Stentiford, "Exploring human eye behavior using a model of visual attention," International Conference on Pattern Recognition 2004, Cambridge, Aug. 23-26, 2004, pp. 945-948.

F.W.M. Stentiford, "A visual attention estimator applied to image subject enhancement and colour and grey level compression," International Conference on Pattern Recognition 2004, Cambridge, Aug. 23-26, 2004, pp. 638-641.

Rasmussen, C., "Texture-based vanishing point voting for road shape estimation," British Machine Vision Conference, Kingston, UK, Sep. 2004. http://www.bmva.ac.uk/bmvc/2004/papers/paper_261.pdf.

Finlayson, G. et al., "Illuminant and Device Invariant Colour using histogram Equalisation," Pattern Recognition, vol. 38, No. 2 Feb. 9, 2005), pp. 179-190.

F. W. M. Stentiford, "Attention based facial symmetry detection," International Conference on Advances in Pattern Recognition, Bath, UK, Aug. 22-25, 2005.

F. W. M. Stentiford, "Attention based symmetry detection in colour images," IEEE International Workshop on Multimedia Signal Processing, Shanghai, China, Oct. 30-Nov. 2, 2005.

Stentiford et al., "An Evolutionary Approach to the Concept of Randomness," The Computer Journal, pp. 148-151, Mar. 1972.

International Search Report mailed Jun. 24, 2003 in PCT/GB03/01211.

International Search Report mailed Apr. 2, 2002 in PCT/SG 01/00112.

European Search Report dated Jan. 8, 2003 for RS 108248 GB.
European Search Report dated Jan. 9, 2003 for RS 108249 GB.
European Search Report dated Jan. 8, 2003 for RS 108250 GB.
European Search Report dated Jan. 9, 2003 for RS 108251 GB.

International Search Report mailed Feb. 9, 2006 in PCT/GB2005/003339.

Chang et al., "Fast Algorithm for Point Pattern Matching: Invariant to Translations, Rotations and Scale Changes," Pattern Recognition, vol. 30, No. 2, Feb. 1997, pp. 311-320.

English-language translation of Japanese Search Report dated Feb. 26, 2008 in JP 2003-579167.

U.S. Appl. No. 10/506,181, filed Aug. 31, 2004, Stentiford.
U.S. Appl. No. 10/507,598, filed Sep. 14, 2004, Stentiford.
U.S. Appl. No. 10/537,540, filed Jun. 3, 2005, Stentiford.
U.S. Appl. No. 10/581,027, filed May 30, 2006, Stentiford.
U.S. Appl. No. 11/661,984, filed Mar. 6, 2007, Stentiford.
U.S. Appl. No. 11/916,475, filed Dec. 4, 2007, Stentiford.
U.S. Appl. No. 12/085,775, filed Jan. 16, 2008, Shilston.

International Search Report mailed Sep. 11, 2006 in PCT/GB2006/002001.

Geusebroek et al., "Robust autofocusing in microscopy," *Cytometry*, vol. 39. No. 1, Feb. 2000, pp. 1-9, XP002379688.

International Search Report for PCT/GB2006/004602 mailed Feb. 28, 2007.

* cited by examiner

IMAGE ANALYSIS RELATING TO EXTRACTING THREE DIMENSIONAL INFORMATION FROM A TWO DIMENSIONAL IMAGE

This application is the U.S. national phase of International Application No. PCT/GB2006/002444 filed 30 Jun. 2006 which designated the U.S. and claims priority to European Patent Application No. 05254728.8 filed 28 Jul. 2005, the entire contents of each of which are hereby incorporated by reference.

BACKGROUND

The present invention is concerned with image analysis and more particularly with extracting three-dimensional information from a two-dimensional image.

Perspective is present to some extent in all images that reflect 3D information. Parallel lines in the three dimensional scene project to vanishing points in the image. Locating the vanishing points provides a powerful way of inferring 3D structure from a 2D image especially in a landscape or a man-made environment. Lutton et al [1] extract edges and assemble line segments which point towards vanishing points. This approach requires knowledge of camera parameters and has to deal with large numbers of very short segments arising from certain images. McLean et al [2] cluster gradient orientations to again detect line structure in images and evaluates the method against two grey level images. Along with other authors Shufelt [3] uses a Gaussian sphere representation and addresses the problem of spurious edges in images with a limited range of object orientations.

Rother [4] applies the ideas to architectural environments and rejects falsely detected vanishing points by making use of camera parameters. Cantoni et al [5] explores two approaches, one using the Hough transform and the other edge detection. Successive analyses are required to locate multiple vanishing points. Almansa et al [6] proposes a method not dependent on camera parameters which searches for image regions that contain maximum numbers of line segment intersections. Curved boundaries in images that do not contain actual vanishing points can cause false alarms. Gabor wavelet filters are used by Rasmussen [7] to obtain dominant texture orientation in images of roads.

Some techniques for analysis of images or other patterns where the pattern is compared with other parts of the same pattern are described in our earlier patent applications as follows.

European patent application 00301262.2 (publication No. 1126411) (applicants ref. A25904EP#);
International patent application PCT/GB01/00504 (publication No. WO 01/61648) (applicants ref. A25904WO);
International patent application PCT/GB01/03802 (publication No. WO02/21446) (applicants ref. A26055WO);
U.S. patent application Ser. No. 09/977,263 filed 16 Oct. 2001 (publication No. 20020081033) (applicants ref. A25904US1);
International patent application OPCT/GB2006/002001 (A30776).
as well as the following papers published by the inventor:
Stentiford F W M, "An estimator for visual attention through competitive novelty with application to image compression", Proc. Picture Coding Symposium 2001, Seoul, 25-27 April, pp 101-104, 2001.
Stentiford F W M, "An evolutionary programming approach to the simulation of visual attention", Proc. Congress on Evolutionary Computation 2001, Seoul, pp 851-858, 27-30 May, 2001.

Methods and apparatus for comparing patterns are described in our earlier international patent application WO03/081523 (A30179) and our U.K. patent applications 0420727.0 dated 17 Sep. 2004 (A30519) and 0503944.1 dated 25 Feb. 2005 (A30705).

Aspects of the present invention are set out in the claims.

BRIEF DESCRIPTION OF DRAWINGS

Some embodiments of the present invention will now be described, with reference to the accompanying drawings, in which.

DETAILED DESCRIPTION OF PRESENT EXAMPLE EMBODIMENTS

Figure 1:
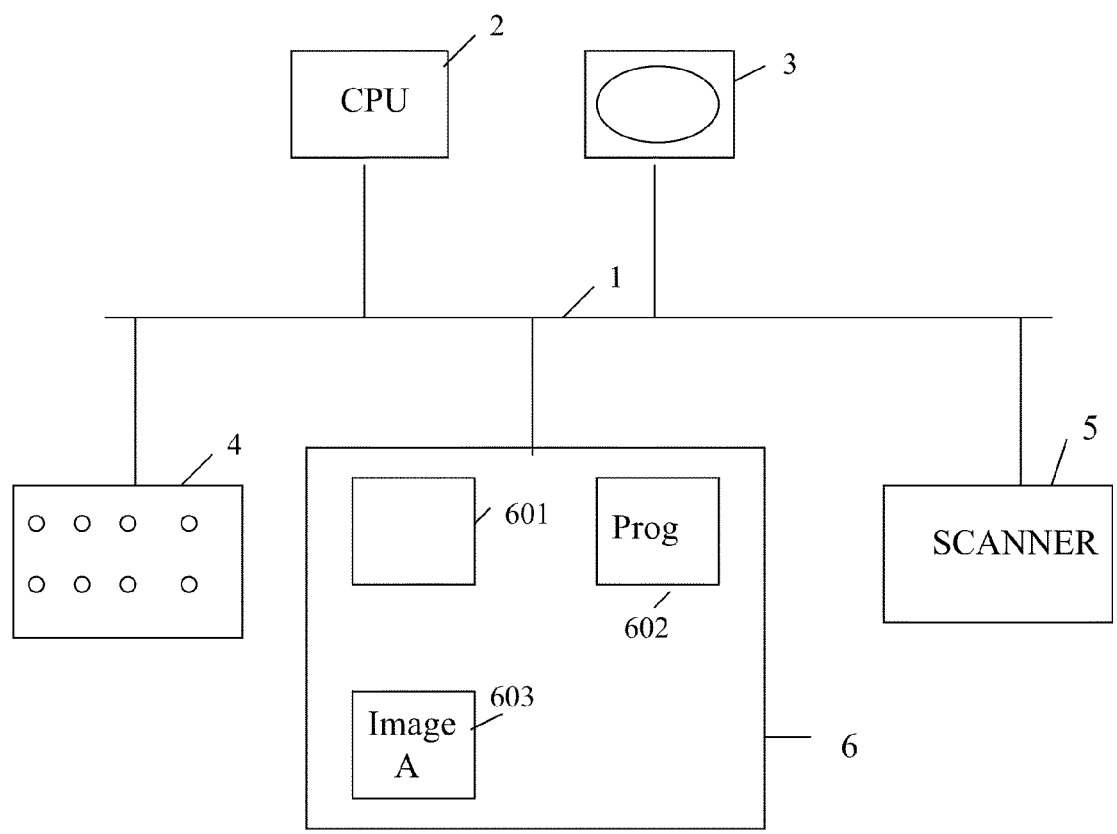
FIG. 1 is a block diagram of an apparatus for performing the method of the invention.

FIG. 1 shows an apparatus consisting of a general purpose computer programmed to perform image analysis according to a first embodiment of the invention. It has a bus 1, to which are connected a central processing unit 2, a visual display 3, a keyboard 4, a scanner 5 (or other device, not shown) for input of images, and a memory 6.

In the memory 6 are stored an operating system 601, a program 602 for performing the image analysis, and a storage area 603 for storing an image. The image is stored as a two-dimensional array of values, each value representing the brightness and/or colour components of a picture element within the array.

An image array consists of an array of picture elements $x_i=(x_i, y_i)$ where $x_i$ and $y_i$ are the horizontal and vertical positions of the elements within the image. Each element has a respective value $\alpha=\alpha(x_i)$. In the case of a monochrome image this would be a scalar value, the brightness $\alpha$, or in colour would be a vector comprising a set of colour components such as (in r,g,b representation) $a=(\alpha_r, \alpha_g, \alpha_b)$.

Figure 2:
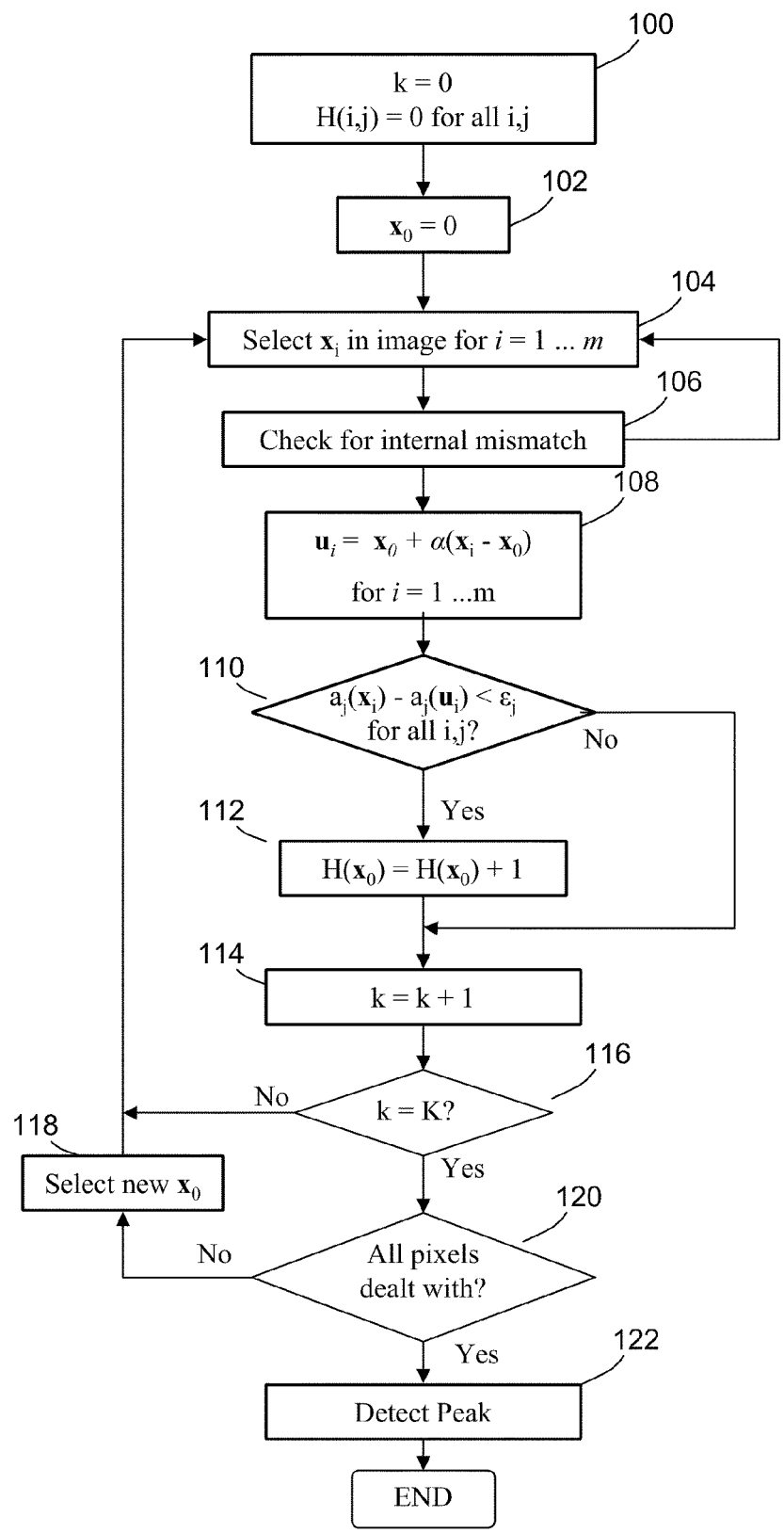
FIG. 2 is a flowchart illustrating the operation of one embodiment of the invention.

FIG. 2 is a flowchart explaining the application of the method. In Step 100, a set of scores H(i,j) is set to zero, and a counter k set to zero. A score is to be generated for each element $x_0$ of the image array. They can be dealt with any order but as shown we start with $x_0$ set to 0,0 at Step 102. For convenience this is referred to in this description as the root.

The first task of the method is to make a random selection of elements in the image. This may be visualised as stabbing the image with an irregular fork having m tines. Note that, throughout this specification, references to a random selection also envisage the possibility of selection by means of a pseudo-random process. Also, a reference to random selection envisages the possibility not only of a random selection for which the selection of any value (within a range specified) is equally probable, but also of a selection in accordance with a non-uniform probability distribution.

Thus, at Step 104 a set $S_x$ of m elements at random positions $x_i$ is selected in the image, subject to the constraint that all elements lie within the image. An example set is shown in FIG. 3(a).

Note that this process permits the occurrence of one or more pairs $x_i=x_j$ $i \neq j$ i.e. the $x_i$ are not constrained to be distinct. This is not objectionable in practice but if desired may be eliminated by testing for it and reselecting one member of the matching pair.

For reasons which will become apparent, it is undesirable to choose a set of elements where all, or many, members of the set lie in an area of uniform colour. Thus, at Step 106 a test is performed to check whether at least h of the members differ by more than a threshold amount from all other members of the set. That is, $$|a_j(x_p)-a_j(x_q)|>\epsilon_j, q=1\ldots m$$

is true for at least h distinct values of p. For any p it is sufficient that it is true for one value of j (i.e. not all colour components need to mismatch). If it is not true the elements are reselected at 104.

The next stage (Step 108) is to define a second set $S_u$ of m elements $u_i$ within the image, having vector positions relative to the root $x_0$ that are reduced by a factor $\alpha$ as compared with the relative vector positions of the previously selected set $S_x$. That is, $u_i = x_0 + \alpha(x_i - x_0)$ for all i. This may be visualised (see FIG. 3(b)) as stabbing image with the shrunken version of the same fork as used for $x_i$.

It is to be determined whether each of the selected elements $x_i$ matches the corresponding element $u_i$. The test for a match occurs at Step 110. In the r, g, b case a match occurs if $$\text{Dist}[a(x_i) - a(u_i)] < \delta \text{ for all } i = 1 \ldots m$$

Where Dist is some distance operator (e.g. Euclidean or city-block), or the vector components may be thresholded separately, e.g. for colour components $$|a_r(x_i) - a_r(u_i)| < \delta_r, \text{ and}$$

$$|a_g(x_i) - q_g(u_i)| < \delta_g \text{ and}$$

$$|a_b(x_i) - a_b(u_i)| < \delta_b \text{ for all } i = 1 \ldots m$$

where $\delta_r$, $\delta_g$ and $\delta_b$ are some small threshold values which will commonly be equal.

If a match occurs, then at Step 112 the Score $H(x_0)$ is incremented. It could simply be incremented by 1 (or other fixed value).

Once the score has been updated (or when there is no match), then the iteration counter k is incremented at 114 and tested at 116 to see if it has reached a maximum iteration count K; if not, the process returns to Step 104 for a further iteration with a new fork shape.

Figure 3:
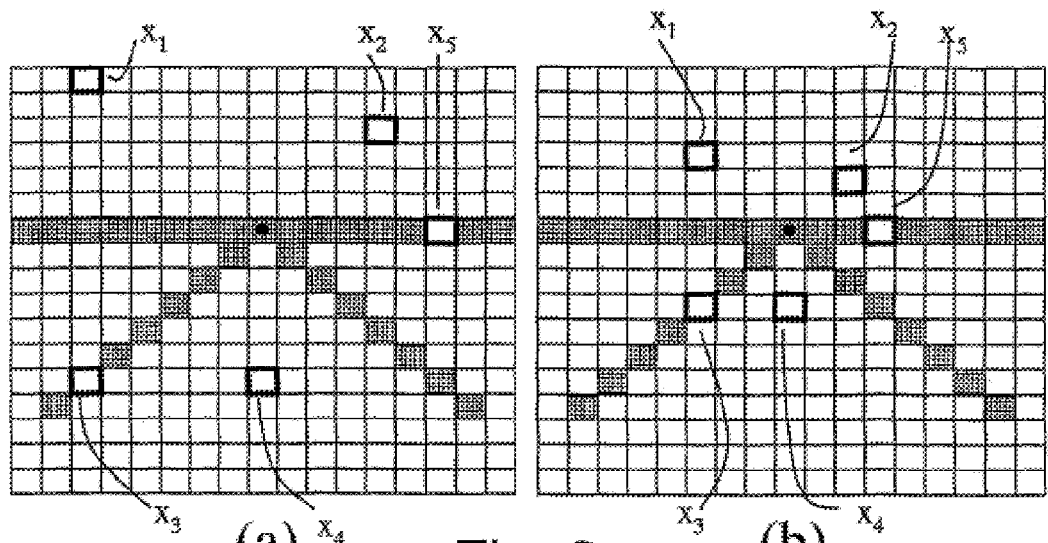
FIG. 3 is a diagram with illustrative pixel selections.

Once K tests have been performed, then a fresh pixel is dealt with by pointing $x_0$ to a new root at Step 118 and the process repeated from 104. When all elements have been processed this is recognised at 120. At this point the score matrix H contains, in effect, a histogram indicating the number of matches obtained for each root. Patterns that converge toward the root tend to generate large numbers of matches for that position—for example, FIG. 3 shows a m=5 pixel fork x matching an image and its transformed version u, scaled by $\alpha = \frac{1}{2}$ relative to the root V, also matching the image. A high number of such matches would indicate that the point V may be a vanishing point. Thus a vanishing point appears as a peak in the histogram. Although parallel lines in a scene all converge to a single vanishing point, other lines that are at a different angle (but parallel) to one anther) will converge at a different vanishing point. Providing that the lines are (in the original scene) horizontal, then their vanishing points lie on the horizon; thus if there are many such vanishing points the horizon will appear as a ridge in the histogram.

Thus, the next step, at 122, is to detect the position of any peak in the histogram. The criterion for this is the location of the image element $x_0$ with the highest score $$\max_x^{-1} H(x).$$

Alternatively the peak may be located after first smoothing the histogram with a Gaussian or other type of filter. Multiple peaks may be located by gradient ascent from different starting points.

As described above, the scaling factor $\alpha$ is fixed. A value of ½ is suggested. Other values may be chosen, dependent on the picture content. In general, values close to unity are unsatisfactory as they tend to result in large numbers of matches simply because the change in fork size is insufficient to cause a mismatch. Very small values will tend to make the results more susceptible to noise and hence unreliable. It is not actually essential that $\alpha$ be fixed, though naturally the same value must be used for scaling each of the m tines of a particular fork on a given iteration k. A randomly varying choice (within set limits) has been tried and found to be successful: this approach may indeed be preferred in situations where the optimum value cannot be predicted.

Note too that values of $\alpha$ in excess of unity are permissible, being simply equivalent to selecting $u_i$ before $x_i$, but are less convenient to implement because of the danger of elements, after scaling, falling outside the image.

Note that it is not useful for one of the selected elements to lie at the root position $x_0$, since such an element is invariant to the scaling and thus always matches. Random selection of $x_i$ will occasionally result in selection of the root, but this is not objectionable in practice. If desired, the condition could be tested for and a reselection made.

The above description also assumes that all points in the image are chosen as the root $x_0$ and have a score generated for them. It is not however essential that all such points be processed: the analysis could be limited to a particular region of interest, or could be done for a subset. Moreover, it is also possible to perform the analysis in respect of root positions outside the image. For example, some images may contain structure from which it is possible to deduce the position of a vanishing point, notwithstanding that the vanishing point is not itself within the area of the image. In this case there is however a danger that $u_i$ may sometimes fall outside the image area (a danger that is magnified by small values of $\alpha$). This could be, for example, accommodated by immediately after Step 110, testing $u_i$, for any elements falling outside the image are and if there are, returning to step 104 for a fresh selection of the offending elements (or even all of them).

Figure 4:
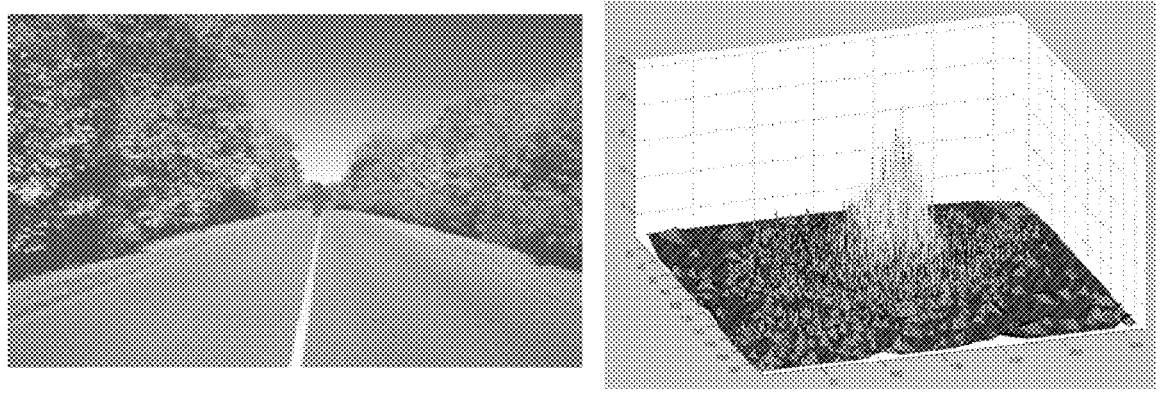
FIGS. 4 to 9 depict some test images and results obtained.
Figure 5:
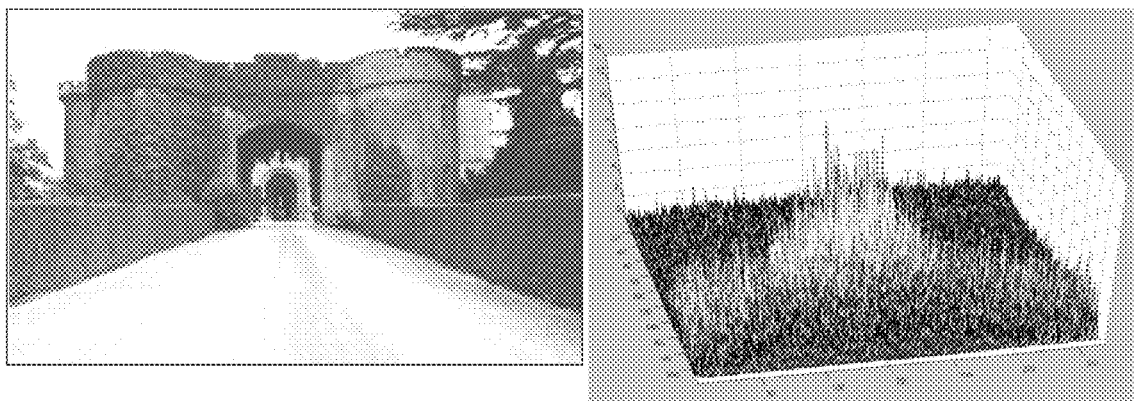
Figure 6:
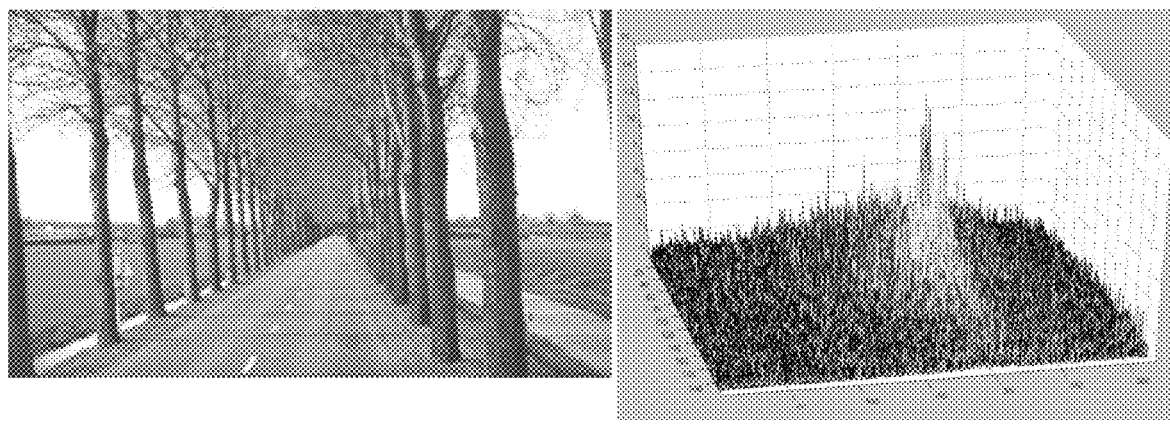
Figure 7:
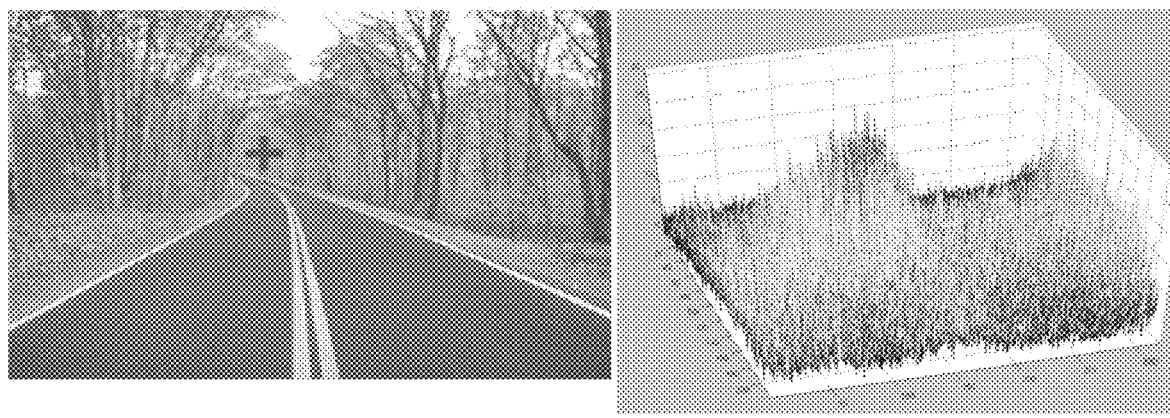
Figure 8:
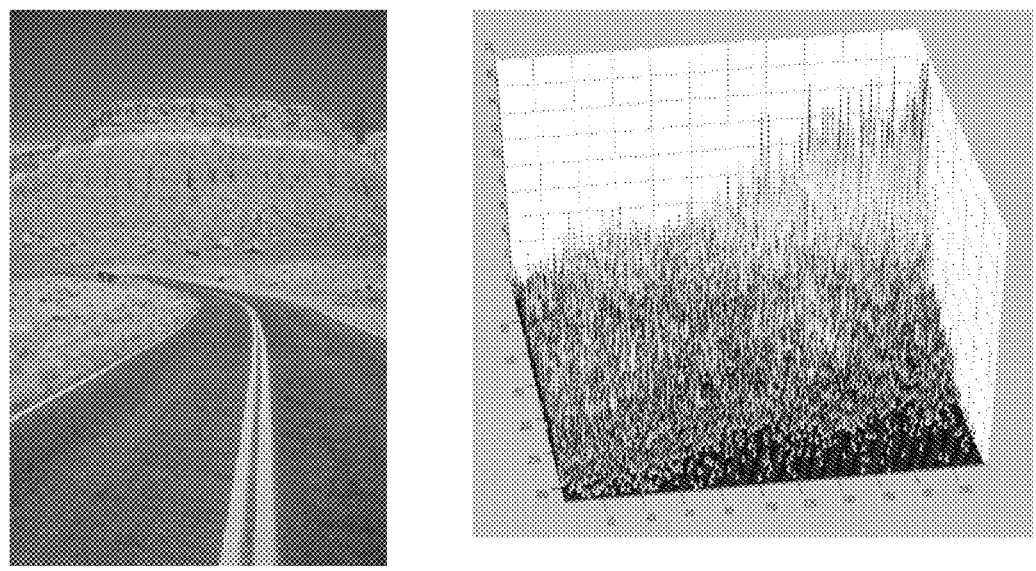
Figure 9:
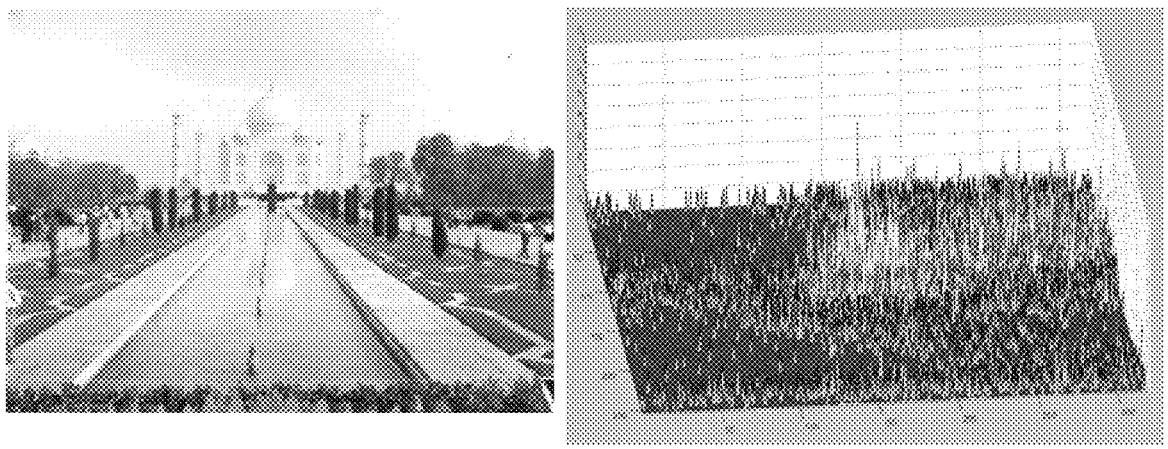

A number of images from the Corel Database with obvious perspective structure were processed and the measure of perspective at each pixel calculated as above. In these results the number of elements (m) in each fork was set at 12, the number of comparisons (K) at 100, and $\alpha$ at 0.5. The position of the peak marking the principal vanishing point was indicated on the image and the individual scores plotted as 3D histograms. In FIG. 4 the perspective of the road, trees and sky all appear to converge on virtually the same point The distribution of highest scores centre on a maximum value in this same area. The peak of perspective is slightly to the left of the entrance in FIG. 5 because of the asymmetric vegetation. Subsidiary peaks follow the lines of the hedges on each side. The detected vanishing point in FIG. 6 lies on the horizon but slight asymmetry pulls the vanishing point to the right of that which might be indicated by the road. High scoring pixels cover the neighbourhood of the road as it disappears to the left in FIG. 7. The peak takes into account the trees and the sky as well as the road and its markings. The perspective scores in FIG. 8 increase towards the horizon, but rise up to a maximum immediately to the right of the mountain. Again this maximum value reflects perspective structure in the sky, the mountain and the road. Other lower peaks align with perspectives arising from the road and the road markings. Finally the principal vanishing point in FIG. 9 is identified.

The results generated here restrict the location of vanishing points to within the boundaries of the image, but the approach is equally applicable to the detection of vanishing points outside the image providing the matching fork pixels $S_x$ and $S_u$ themselves all lie within the image. In these cases $\alpha$ might take values closer to unity and in the limit for infinitely distant vanishing points $\alpha=1$ with the direction of the match being sufficient to capture the perspective information.

As the root becomes further and further away and $\alpha$ becomes closer to unity, in the limit the effect of the scaling is to shift the pixels of fork $S_u$ as compared with $S_x$. Thus, to obtain scores for vanishing points at infinity the transformation becomes $$u_{ik} = x_{ik} + \Delta_{ik}$$

Where the additional subscript k refers to the particular iteration. In this mode, it is wise to limit the fork size—perhaps to dimensions not exceeding half that of the image itself.

The two components of $\Delta_{ik}$ can be chosen at random—and if desired be chosen afresh for each k, and must be chosen such that they do not cause $u_{ik}$ to fall outside the image. In this special case of testing for vanishing points at infinity peaks in the distribution of the direction of the shifts $\Delta_{ik}$ for matching forks give the directions of the distant vanishing points. This approach however does not result in a constant number of iterations for each direction of $\Delta$, so if it is desired to compare values of the score H obtained in this way with scores obtained by scaling, then it would be preferable to perform k iterations for a fixed direction of $\Delta_{ik}$, only the magnitude of $\Delta_{ik}$ being reselected on successive iterations, and repeat this to provide a set of scores H ($\theta$) for a range of angles $\theta$.

Key advantages in this approach over other techniques include the absence of the need for the specification of any a priori features that might characterise the presence of perspective, such as edges or resonance with specific types of filter. This method should still function even if the image is blurred and contains no sharp edges. In addition no knowledge is required of camera parameters or their calibration and no restrictions are placed on the minimum strength of any perspective structure that must be present in the data for the algorithm to function effectively. Finally there is no manual intervention necessary to either initialise or guide the process.

The same basic mechanism has been used to extract reflective symmetries in facial images where the perspective transform (2) was replaced with a reflection through an axis at an angle $\theta$ [10]. The peaks in the distribution of $\theta$ for matching forks gave an indication of the position of axes of symmetry present in the images.

The results reported here have been produced with 100 iterations of fork generation per pixel. Although the computational steps are very simple there are a large number of them and a vanishing point analysis takes about 10 seconds on a 1.8 GHz machine running in C++. The computation may be reduced on a sequential machine by only scoring sampled pixels where it may not be necessary to obtain positional accuracy to the nearest pixel. However, the matching of forks can be carried out in parallel as each match is independent of the next and related implementations on the Texas Instruments DM642 DSP platform indicate that processing can take place at video speeds.

REFERENCES

1. Lutton, E., Maitre, H., and Lopez-Krahe, J., "Contribution to the determination of vanishing points using Hough transform," IEEE Trans. on Pattern Analysis and Machine Intelligence, vol. 16, no. 4, pp 430-438, 1994.
2. McLean, G. F., and Kotturi, D., "Vanishing point detection by line clustering," IEEE Trans. on Pattern Analysis and Machine Intelligence, vol. 17, no. 11, pp 1090-1095, 1995.
3. Shufelt, J. A., "Performance evaluation and analysis of vanishing point detection techniques," IEEE Trans. nn Pattern Analysis and Machine Intelligence, vol. 21, no. 3, pp 282-288, 1999.
4. Rother, C., "A new approach for vanishing point detection in architectural environments," 11th British Machine Vision Conference, Bristol, UK, September, 2000.
5. Cantoni, V., Lombardi, L., Porta, M., and Sicard, N., "Vanishing point detection: representation analysis and new approaches," 11th Int. Conf. on Image Analysis and Processing, Palermo, Italy, September, 2001.
6. Almansa, A., and Desolneux, A., "Vanishing point detection without any a priori information" IEEE Trans. on Pattern Analysis and Machine Intelligence, vol. 25, no. 4, pp 502-506, 2003.
7. Rasmussen, C., "Texture-based vanishing point voting for road shape estimation," British Machine Vision Conference, Kingston, UK, September, 2004.
8. Stentiford, F. W. M., "Automatic identification of regions of interest with application to the quantification of DNA damage in cells," Proc. SPIE. Vol. 4662, pp 244-253, 2002.
9. Stentiford, F. W. M., "An estimator for visual attention through competitive novelty with application to image compression," Picture Coding Symposium, Seoul, pp 101-104, 2001.
10. Stentiford, F. W. M., "Attention based symmetry detection," Int. Conf. on Advances in Pattern Recognition, Bath, UK, August, 2005.
11. Multimedia Understanding through Semantics, Computation and Learning, Network of Excellence. EC 6th Framework Programme. FP6-507752. http://www.muscle-noe.org/

The invention claimed is:

1. A method of analysing an image represented by an ordered set of elements ($x_i$) each having a value, the method comprising for each of a plurality of root positions ($x_0$), repeatedly performing the steps of:
   selecting a first plurality of elements ($x_i$) from the ordered set;
   for each selected element ($x_i$), selecting a second element ($u_i$) such that the selected second element has a vector position relative to the root position that is scaled by a factor ($\alpha$) in comparison with the position of the first selected element;
   determining, using a computer system having at least one processor, whether the selected elements meet a match criterion requiring that the value of each of the first elements is similar to the value of the corresponding second element;
   in the event of a match, updating a similarity score (H) in respect of that root element; and
   selecting at least one of the plurality of root positions as an indication of the location of a vanishing point of the image wherein the at least one selected root position is associated with a peak in the similarity scores (H).

2. A method according to claim 1 including the further step of examining the similarity scores (H) to identify a part of the image corresponding to a peak value of the similarity score.

3. A method according to claim 1 in which all the root positions are positions of elements within the image.

4. A method according to claim 1 in which at least some of the root positions are positions outside the image.

5. A method according to claim 1 in which, in the step of selecting a first plurality of elements, the selection is constrained such that no more than a set number of the selected elements meet a predetermined criterion of similarity to others of the elements.

6. A method according to claim 1 in which the scaling factor ($\alpha$) is fixed.

7. A method according to claim 1 in which the scaling factor ($\alpha$) is freshly chosen for each step of selecting second elements.

8. A method according to claim 1 in which the scaling factor ($\alpha$) is in the range 0.3 to 0.8.

9. A method according to claim 1 in which the images is a colour image, each value comprises brightness and/or colour components, and the match criterion is that the difference between each component of the respective first element and the corresponding component of the corresponding second element does not exceed a set amount.

10. A method of analysing an image represented by an ordered set of elements ($x_i$) each having a value, the method comprising, for each of a plurality of reference directions, repeatedly performing the steps of:

selecting a first plurality of elements ($x_i$) from the ordered set;

for each selected element ($x_i$), selecting a second element ($u_i$) such that the selected second element has a position that is, in comparison with the position of the first selected element, shifted in the respective reference direction by a shift amount ($\Delta$);

determining, using a computer system having at least one processor, whether the selected elements meet a match criterion requiring that the value of each of the first elements is similar to the value of the corresponding second element;

in the event of a match between the two selected elements, updating a similarity score (H) in respect of that reference direction; and selecting at least one of the plurality of reference directions as an indication of the direction of a vanishing point of the image at infinity wherein the at least one selected reference direction is associated with a peak in the similarity scores (H).

* * * * *